Nov. 13, 1962 J. N. BINNS 3,063,132
TOOL UNIT
Filed June 11, 1957 2 Sheets-Sheet 1
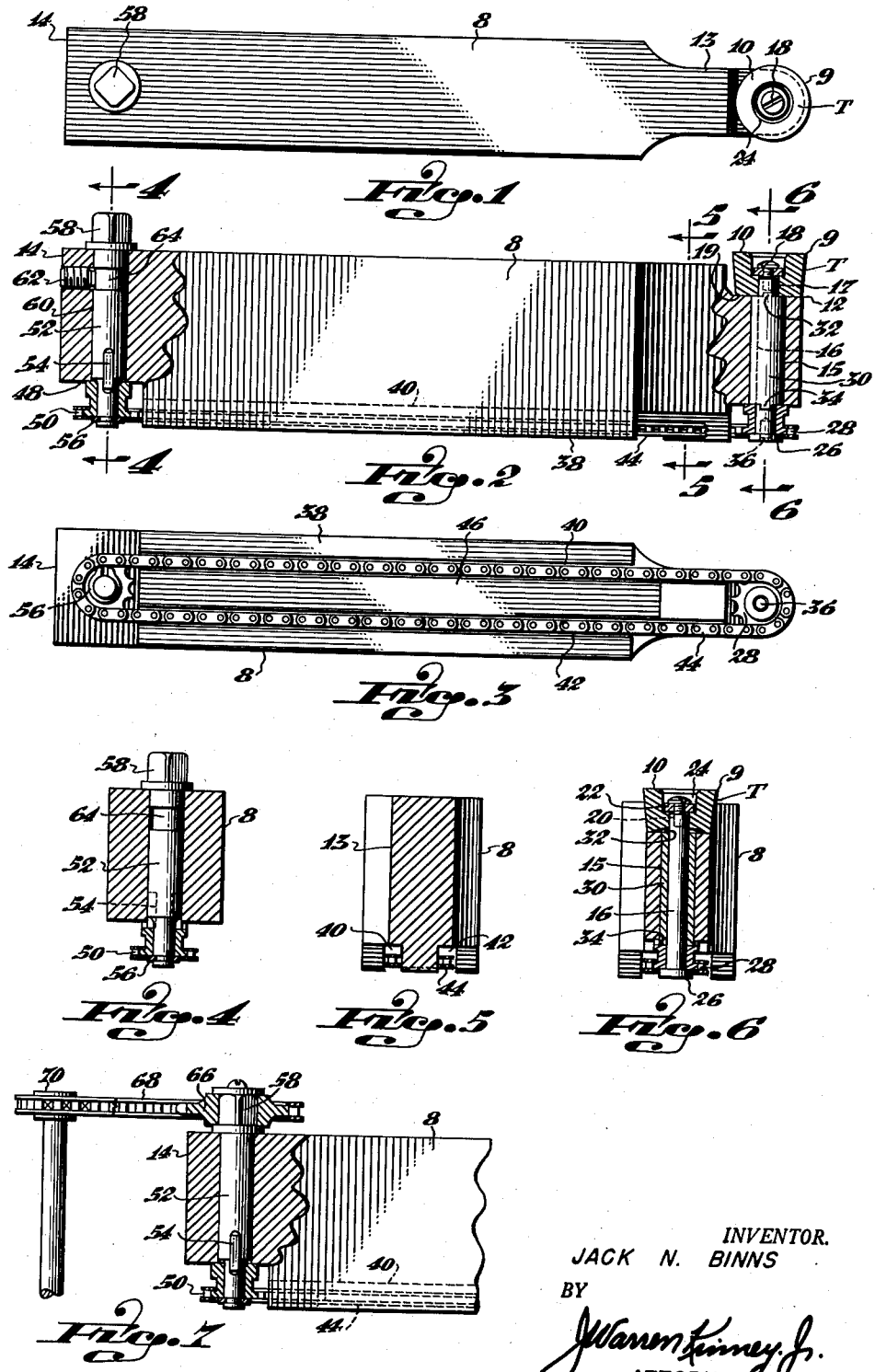
INVENTOR.
JACK N. BINNS
BY
ATTORNEY Nov. 13, 1962  J. N. BINNS  3,063,132
TOOL UNIT Filed June 11, 1957  2 Sheets-Sheet 2

INVENTOR.
JACK N. BINNS
BY
J. Warren Kinney Jr.
ATTORNEY

United States Patent Office 3,063,132
Patented Nov. 13, 1962

3,063,132
TOOL UNIT
Jack N. Binns, Cincinnati, Ohio
Filed June 11, 1957, Ser. No. 665,020
1 Claim. (Cl. 29—98)

This invention relates to a tool unit or assembly, such as may be clamped to the tool post of a lathe or other shaping machine for the turning or shaping of workpieces.

An object of the invention is to provide a tool of unique character, the use of which ensures and expedites production of uniformly finished and accurately formed surfaces upon a workpiece.

Another object of the invention is to achieve a sustained cutting or forming operation uninterrupted by frequent tool replacements, which necessitate costly shut-down periods, and often impart inaccuracies to the work.

A further object is to gain time and speed of production upon a lathe or kindred forming machine, thereby to effect economies in labor and other cost items chargeable to manufacturing expense.

More specifically, it is an object of this invention to provide means for successively presenting fresh cutting edges of a tool to the workpiece, without disturbing the relationship of the tool to the workpiece, and without necessarily interrupting the cutting operation as the fresh cutting edges are presented to the work.

Another object is to reduce the expense of tool grinding, reconditioning, and replacement, in manufacturing operations involving turning.

The foregoing and other objectives are attained by the means described herein and illustrated upon the accompanying drawing, in which:

FIG. 1 is a top plan view of a tool unit embodying the teachings of the present invention.

FIG. 2 is a side elevational view of the unit, partly broken away at opposite ends thereof.

FIG. 3 is a bottom view of the unit, in plan.

FIG. 4 is a cross-sectional view taken on line 4—4 of FIG. 2.

FIG. 5 is a cross-sectional view taken on line 5—5 of FIG. 2.

FIG. 6 is a cross-sectional view taken on line 6—6 of FIG. 2.

FIG. 7 is a view similar to FIG. 2, showing a modification.

Figure 8:
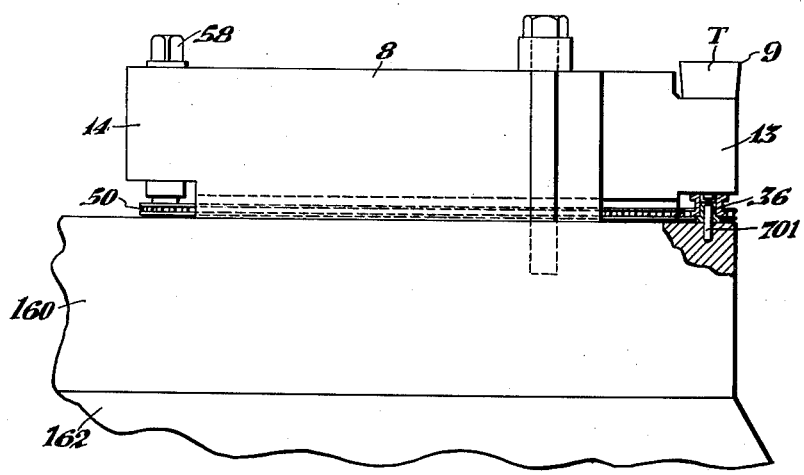
FIG. 8 is a side elevational view of the tool unit operatively associated with a tool post partly broken away at one end thereof.

With reference to the drawings, the part indicated at T may be considered the tool or cutter operative to shape or finish a workpiece, whereas the body or element 8 as a whole is considered the holder for the tool or cutter. The tool holder 8 is usually clamped upon a tool post 160, FIG. 8, carried by the lathe carriage 162, and is so disposed relative to a rotating workpiece as to maintain an edge 9 of the tool in position to operate upon the workpiece while the latter is rotating. The tool post usually includes means for adjusting the elevation of the cutter edge 9 relative to the axis of rotation of the workpiece.

According to the present invention, the cutter T may be in the form of a short cylinder or preferably a truncated cone as illustrated by FIG. 2, with its outer upright wall meeting an upper end face 10, to produce the sharp cutting edge 9 extending peripherally and uninterruptedly about the outer curved wall of the cutter. The circular base portion 12 of the cutter has an outer periphery which rests in a plane parallel to the plane which includes the cutter edge 9, so that axial rotation of the cutter upon its base 12 will produce no change in elevation of the cutter edge 9 relative to a workpiece supported in operative relationship to the cutter. From this it will be understood that any point on the 360 degree extent of the cutting edge 9 may be presented to the workpiece, by simply rotating the cutter or tool T upon its axis, while supported by the tool holder.

The tool holder may be in the form of an elongate block of metal or other rigid material, having a head end 13 and a tail end 14, the head end being preferably reduced in thickness to a dimension less than the diameter of cutter T, thereby to expose the major portion of edge 9 for service incident to a machining operation. The reduced head end provides a rigid mount for the tool or cutter, and for mounting purposes it may be bored at 15 to receive an upright pin 16, one end of which is received in the central bore 17 of the cutter. By means of a suitable fastener, for example a screw 18, the cutter or tool may be detachably fixed to pin 16, and through said pin to the tool holder, with the base portion 12 of the cutter resting firmly upon a planar seat 19 of the tool holder head, formed marginally of the bore 15. Screw 18 may engage an internally threaded axial bore 20 in the upper end of pin 16, the head of the screw bearing upon a washer 22 which impinges upon the base of a counterbore 24 to hold the cutter against the seat 19 of the tool holder head.

Pin 16 may be provided at its lower end with a head 26, the purpose of which is to retain a sprocket 28 in position upon the pin. Means are provided to impart rotational movements of the sprocket to the cutter or tool T, and to accomplish this with a positive non-slip action, a sleeve 30 is disposed about the pin 16 and embraced loosely within the bore 15 for rotation therein, opposite ends of the sleeve having positive drive connections with the sprocket and with the base portion of cutter T. The positive drive connections may be achieved in various ways, as by means of dog teeth 32 and 34 on the sleeve ends engaging cooperative recesses or sockets in the bases of the cutter and the sprocket, respectively, as will readily be understood.

A socket 36 provided in the lower end of pin 16 is adapted to receive a complementary pin 701, FIG. 8, provided on and projecting upwardly from the tool post with which the subject tool is associated. The fit between such an upwardly projecting tool post pin 701 and socket 36 is a running fit to permit relative rotation between the pin and socket. In this manner I have provided means for facilitating location of the tool relative to the tool holder and, in addition thereto, the tool post pin will limit the deflection of the tool under load.

From the foregoing explanation, it is evident that means have been provided for controlled positive driving of the cutter by sprocket 28, and for quick and easy replacement of cutters when necessary. It may be noted also that the head end of the tool holder, including the tool or cutter, is no greater in width than the thickness of the tool holder, this being advantageous in the application and removal of the tool holder with respect to the tool post which supports it.

The body of the tool holder preferably is formed from a single bar or block of steel, or other suitable material, substantially uniform in cross-section throughout the major portion of its length. At the underside, 38, the body may be milled or otherwise formed to provide a pair of parallel channels 40 and 42, adapted to accommodate the parallel reaches of a continuous chain 44 employed for driving the sprocket 28 from a location near the tail end of the tool holder. If desired, the channels may be separated by means of a medial reinforcing rib 46 flanked by the chain reaches. In any event, the chain preferably is substantially concealed and guarded in the interests of safety, and protection against accidental injury.

The tool holder at its tail end may be stepped to provide a shoulder 48 against which the hub of a driving sprocket 50 may bear, as the sprocket supports the chain 44 within the channel means 40, 42. An actuator in the form of a shaft 52 carries the driving sprocket 50, which is fixed to one end thereof as by means of a key 54 and a split ring 56 or equivalent retaining device. The key 54, being in engagement with the shaft and the sprocket hub, provides for positive transmission of movement from the actuator head 58 of shaft 52, to the chain which embraces the sprockets 50 and 28. Since the drive from sprocket 28 to cutter T likewise is positive in character, every rotational movement of the actuator head 58 is necessarily transmitted to the cutter or tool T.

The actuator head 58, herein shown as a squared shaft end for accommodating a wrench or similar implement, might be developed into any suitable form of handle, wheel, or other form of manipulator, as may be found convenient or desirable for remote control and adjustment of the cutter. As a simple means of mounting the shaft 52 near the tail end of the tool holder, a bore 60 may be employed to support the shaft laterally, while by means of a set screw 62 or the like engaging an annular groove 64 in the shaft, said shaft may be locked selectively in any rotated position. It may be found convenient to substitute for the set screw 62, a thumb screw or other form of locking means for the shaft 52. Shaft 52 is preferably parallel to the cutter support pin 16, as shown, and with the exception of head 58, the shaft should preferably be confined within the limits of the tool holder dimensions.

To use the device of the invention, the unit carrying the cutter T and all the other constituents as illustrated upon the drawing, is to be fixed to the tool post 160 or an equivalent element of a lathe carriage 162, with the edge 9 of the tool or cutter disposed in proper cutting position relative to a rotating workpiece. That portion of the cutter edge which is in contact with the workpiece may be permitted to remove material from the workpiece until dulling of the edge becomes evident; thereupon, the operator may present a fresh cutting edge to the work by merely loosening the clamp element 62, and then rotating the shaft 52 slightly to correspondingly rotate the cutter T. The slight rotation of the cutter displaces the dull portion thereof and brings into use position an adjacent sharp edge. The procedure may be repeated many times before the cutter resumes the original cutting position, at which a dull portion of the edge may reappear at the workpiece.

After all sections of the cutter edge have been used, the cutter or tool may be removed bodily from the tool holder and replaced with a new one, this being accomplished by merely releasing the cutter at the screw connection 18. Resharpening of the cutter is a very simple procedure, due to the fact that its contour is a regular geometric shape, such as a cylinder or a truncated cone of slight taper. The cutter or tool is, of course, fabricated from a proper grade and type of steel or other material suited to the service required of it, and the tool holder as a unitary assembly is preferably standardized as to shape and size, for reception by a standard form of tool post or support. The unit herein disclosed is structurally adapted for use in standardized equipment, this consideration having been incorporated in designing and arranging the constituents of the assembly.

The device of the invention is particularly suited for operation upon a workpiece for precision machining along an extensive surface, upon which a change of tools or a tool adjustment, might produce a vary slight yet intolerable variation of finish characteristics or dimensions. With the use of the device herein disclosed, successive presentations of fresh cutting edges of the tool to the work causes no disturbance whatever to original adjustments, and accordingly, the workpiece will show no evidence that a cutting edge has been restored or substituted, perhaps many times, in the course of a protracted turning operation. The machinist may present new cutting edges to the work either frequently or infrequently, as the job may demand, by merely imparting slight rotational movements to the actuator 58, and in so doing he avoids shutting down the machine and interrupting the work schedule. Actuation of the device may be effected while the lathe is operating, if desired, and long periods of turning may be performed before tool replacement becomes necessary.

In the modification illustrated by FIG. 7, the general arrangement of FIG. 2 is substantially duplicated insofar as the shaft 52 drives the sprocket 50, for rotating the tool or cutter T at the head end of the tool holder, as previously explained. The shaft 52 of FIG. 7, however, is adapted for rotation automatically as the workpiece is traversed by the tool or cutter; that is, a positive slow rotation of the tool or cutter is provided for, as the carriage which supports the tool holder moves to traverse the workpiece during the cutting operation. This automatic rotation of cutter T may be accomplished in various ways, as by providing the shaft 52 with a driving means, here exemplified as a sprocket 66 and hcain 68, actuated by a sprocket 70 on the machine carriage driven by the lead screw or any appropriate moving part of the tool carriage or feed mechanism of the lathe. If a sprocket such as 66 is utilized in driving the shaft 52, it will, of course, have a fixed mounting upon the shaft end 58 so as to ensure a positive driving connection therewith. It will be understood that in place of the sprocket 66, some other common form of drive means for the shaft 52 might be employed, for example, gearing or a flexible shaft or the like. The nature of the drive for shaft 52 may be such as to rotate the shaft either continuously or intermittently, at a slow rate, as the tool operates to shape or finish the workpiece.

In some cases, where, for example, the tool performs a facing operation, the automatic drive for slowly rotating the tool or cutter T may be actuated by the tool feed mechanism of the lathe, rather than by the carriage translating mechanism thereof. Either of these sources of power or motion will be found available on most lathes or shaping machines of a similar nature.

Although the foregoing explanation presupposes application of the improved tool to operations involving turning, the tool may be found well suited for use upon shapers, planers, and similar machines wherein either the tool or the workpiece is translated in the performance of the shaping or finishing operation.

It is to be understood that various other modifications and changes in structural details may be resorted to, within the scope of the appended claim, without departing from the spirit of the invention.

What is claimed is:

A cutting tool assembly comprising in combination, an elongated tool holder body having a head end and a tail end, said body having channels formed in one surface thereof and extending through an intermediate portion of said body between the head end and tail end thereof, said body having bores formed completely therethrough at the head end and tail end thereof, said bores extending substantially normally to said channels, cutter support means journaled in the bore in the head end of said body, and a cutter member detachably secured to one end of said support means for rotation therewith, said cutter member having a substantially circular peripheral cutting edge, a sprocket secured to the opposite end of said cutter support means for rotation therewith, said sprocket being disposed in a plane including said channels of the tool holder body, a shaft rotatably journaled in the bore in the tail end of said body, a second sprocket secured to one end of said shaft for rotation therewith, said second sprocket being in the same plane with the channels and the first-mentioned sprocket, an endless chain trained about the sprockets with opposite reaches of the chain disposed within said channels, thereby providing a positive driving connection between said shaft and said cutter member, and the opposite end of said shaft having means rotatable therewith projecting outwardly of said body means for receiving a turning implement whereby the rotational position of said cutter member may be selectively adjusted from the tail end of said tool holder, and means for locking said cutter member at selected positions of rotational adjustment, said locking means including an annular groove formed in said shaft, said tool holder body having a laterally extending bore opening adjacent said annular groove, and a locking member mounted within said last-mentioned bore for engagement in said groove whereby the shaft may be locked at a fixed rotational position such that the cutting member is correspondingly locked in a fixed rotational position.

References Cited in the file of this patent

UNITED STATES PATENTS

| | | |
|---|---|---|
| 40,225 | Alexander | Oct. 13, 1863 |
| 950,222 | Cluley | Feb. 22, 1910 |
| 989,674 | Weiss | Apr. 18, 1911 |
| 1,855,971 | Kilmer | Apr. 26, 1932 |
| 2,289,344 | Cedarleaf | July 14, 1942 |

FOREIGN PATENTS

| | | |
|---|---|---|
| 166 | Great Britain | Jan. 17, 1868 |
| 122,969 | Germany | Aug. 15, 1901 |
| 204,953 | Great Britain | Oct. 11, 1923 |
| 212,871 | Germany | Aug. 12, 1908 |
| 603,968 | Great Britain | June 25, 1945 |
| 680,882 | France | Jan. 23, 1930 |
| 682,739 | Germany | Oct. 21, 1939 |